US005679316A

United States Patent [19]

Ikenaga et al.

[11] Patent Number: 5,679,316
[45] Date of Patent: Oct. 21, 1997

[54] ACTIVATED CARBON, PRODUCTION THEREOF AND ADSORPTION USING ACTIVATED CARBON

[75] Inventors: Yoshihiro Ikenaga; Takeji Kobata, both of Hokkaido, Japan

[73] Assignee: The Social Welfare Foundation Hokkaido Rehabily, Hukkaido, Japan

[21] Appl. No.: 425,133

[22] Filed: Apr. 19, 1995

Related U.S. Application Data

[63] Continuation of Ser. No. 936,116, Aug. 27, 1992, abandoned, which is a continuation of Ser. No. 669,917, Mar. 15, 1991, Pat. No. 5,186,914.

[30] Foreign Application Priority Data

Nov. 26, 1990 [JP] Japan ................................ 2-325036

[51] Int. Cl.$^6$ ................................................. C01D 3/00
[52] U.S. Cl. .................... 423/449.7; 502/416; 423/449.1
[58] Field of Search ........................... 423/449.7, 445 R, 423/449.1; 502/416; 110/346

[56] References Cited

U.S. PATENT DOCUMENTS

| | | | |
|---|---|---|---|
| 1,606,380 | 11/1926 | Pagenkoff | 423/449.7 |
| 2,992,895 | 7/1961 | Feustel et al. | |
| 3,147,097 | 9/1964 | Aguas | |
| 3,926,590 | 12/1975 | Aibe et al. | |
| 3,933,441 | 1/1976 | Massoubre | 420/117 |
| 4,171,345 | 10/1979 | Toshev et al. | 423/449.7 |
| 4,231,998 | 11/1980 | Gutierrez | 423/449.7 |
| 4,251,500 | 2/1981 | Morita et al. | 423/449.7 |
| 4,647,443 | 3/1987 | Apffel | 423/449.7 |
| 4,710,363 | 12/1987 | Fruhbuss | |
| 4,833,171 | 5/1989 | Sweeney | 252/373 |
| 4,839,151 | 6/1989 | Apffel | |
| 5,186,914 | 2/1993 | Yoshihiro et al. | 423/239.1 |

FOREIGN PATENT DOCUMENTS

| | | |
|---|---|---|
| A-404 200 | 9/1910 | France. |
| A-2 139 678 | 4/1973 | Germany. |
| A-2 352 790 | 4/1974 | Germany. |
| A-1 537 033 | 12/1978 | United Kingdom. |
| WO-A-9 114 495 | 10/1991 | WIPO. |

OTHER PUBLICATIONS

World Patents Index Week 7621, Derwent Publications Ltd., London, GB; AN 76–39019X & JP–A–51 041 694 (Yokohama Rubber KK) Apr. 9, 1976. * abstract *.
World Patents Index Latest Week 8845, Derwent Publications Ltd., London GB; AN 88–321093 & SU–A–1 392 026 (Lenneftekhim) Apr. 30, 1988. * abstract *.
Industrial & Engineering Chemistry Research, vol. 26, No. 12, 1987, Ogasawara Sadao et al, "Preparation of Activated Carbon by Thermal Decomposition of Used Automotive Tires", pp. 2552–2556. * abstract* * p. 2552, left–hand col., lines 16–20 and 30–33 * (no month).
Patent Abstracts of Japan, vol. 13, No. 376 (m–862) Aug. 21, 1989 & JP A–01 127=812 (Hokkaido Rihabirii), May 19, 1989 * abstract *.

*Primary Examiner*—Wayne Langel
*Assistant Examiner*—Stuart L. Hendrickson
*Attorney, Agent, or Firm*—Darby & Darby

[57] ABSTRACT

An activated carbon has a pencil hardness of B–6B, pore size of 100–400 Å, specific surface area of 150–500 m$^2$/g, pore volume of 1.3–5.0 ml/g, and if desired, CEC of 8–13 and is composed of carbon microcrystals irregularly arranged.

The activated carbon can be produced by burning waste tires containing metal wires. The activated carbon can be used for removing SO$_2$ and/or Nox formed by combustion of heavy oil.

7 Claims, 7 Drawing Sheets

ACTIVATED CARBON, PRODUCTION THEREOF AND ADSORPTION USING ACTIVATED CARBON

This is a continuation of application Ser. No. 07/936,116, now abandoned, filed Aug. 27, 1992; which in turn is a continuation of application Ser. No. 07/669,917, filed Mar. 15, 1991, now U.S. Pat. No. 5,186,914.

BACKGROUND OF THE INVENTION

1. Field of the Invention

The present invention relates to an activated carbon, a process for producing the activated carbon and adsorption using the activated carbon.

2. Description of the Related Art

Activated carbon is a porous carbonaceous substance having a large specific surface area and large adsorption ability and has a wide range of uses as an adsorbent for various purposes.

Activated carbon can be used for adsorbing gases and vapors, recovering solvents, purifying gases, deodorizing gases, and contacting with liquids so as to treat water, decolor or purify solutions. Further, activated carbon can be used as carriers for catalysts.

Heretofore, activated carbon has been manufactured by treating wood or brown coal with an activating agent, e.g. zinc chloride, phosphoric acid and the like followed by dry distillation, or by activating charcoal with steam. For example, charcoal, coconut husk, coal char and the like are sufficiently carbonized followed by a high temperature treatment by means of steam. Or the activated carbon is activated by soaking in zinc chloride and calcination at a high temperature.

Activated carbon usually has specific surface area of 800–1200 $m^2/g$, pore volume of 0.2–2 $cm^3/g$ and pore size of 1–4 nm.

Activated carbon is comprised of mainly carbon and small amounts of hydrogen, oxygen and inorganic components. With respect to the chemical structure, activated carbon is mainly composed of graphite, amorphous and has functional groups such as hydroxy group, quinone group and the like on the surface.

According to the present invention, it is contemplated to produce an activated carbon of excellent adsorbability by using waste tires which have recently caused difficult problems as to disposal, in place of ordinary starting materials, such as charcoal, brown coal, coconut husk, coal char and the like. Further it is contemplated to use particular properties of the activated carbon effectively.

Japanese Patent Application Laid-open No. Hei 1- 127812 discloses that waste tires are burned as a fuel for boilers and the resulting cinder adsorbs perchloroethylene gas to some extent.

Exhaust gas from combustion of heavy oil, such as from heavy oil combustion boilers, contains sulfur oxide ($SO_2$) and nitrogen oxides (Nox) which cause acidic rain, and therefore $SO_2$ and Nox should be removed from the exhaust gas. Heretofore, removal of these harmful components has been carried out as shown below.

In coal thermoelectric power plants, coal cinders are mixed with quick lime and gypsum and the resulting mixture is used for adsorbing $SO_2$ in the exhaust gas.

This mixture material is a product solidified with pitch.

In coal combustion boilers and heavy oil combustion boilers, 99% of the exhaust gas treatment apparatuses for removing harmful substances, $SO_2$, Nox and like is carried out by a wet-type means and the adsorbents are quick lime, gypsum and the like. However, these adsorbents are washed, i.e. so-called treatment with water.

Other than the above-mentioned methods, dry type treatments using coal ash, lime and gypsum are available.

The treatments as mentioned above have the following problems. Those apparatuses are large in size, complicated and the mechanism is of a large scale.

Even in case of dry type treatments, conventional apparatuses have separately a desulfurization tower and a denitration tower, or require a step comprising mixing different components, kneading and solidifying the mixture with water and shaping by drying.

In a wet type apparatus, there are provided separately a dust removing tower and an absorbing tower, and the exhaust gas is washed with a water shower and the waste water is subjected to a water treatment. The dry type treatment using coal-ash, lime and gypsum also costs as much as the wet type treatment.

The present invention has been made in view of the problems of the conventional treating techniques.

SUMMARY OF THE INVENTION

An object of the present invention is to provide an activated carbon having a large pore size and a large pore volume though the specific surface area is small, and further useful characteristics.

Another object of the present invention is to provide a simple and effective method or apparatus for removing $SO_2$ and/or Nox from an exhaust gas from heavy oil combustion, in particular, from heavy oil combustion boilers.

According to one aspect of the present invention, there is provided an activated carbon which comprises carbon microcrystals irregularly arranged and difficultly graphitizable carbon which comprises difficultly graphitizable crosslinking lattices in the gaps among carbon microcrystals and has pencil hardness of from B to 6B, pore size of 100–400 Å, specific surface area of 150–500 $m^2/g$, pore volume of 1.3–5.0 ml/g, and, if desired, CEC of 8–13.

According to another aspect of the present invention, there is provided a method for removing $SO_2$ and/or Nox from an exhaust gas formed by the combustion of heavy oil which comprises passing the exhaust gas through the activated carbon as mentioned above.

According to a further aspect of the present invention, there is provided an apparatus for removing $SO_2$ and/or Nox from an exhaust gas formed by the combustion of heavy oil which comprises a conduit for discharging the exhaust gas to the open air and a screen portion accommodating the activated carbon of the present invention as mentioned above fitted to said conduit across said conduit.

According to still another aspect of the present invention, there is provided a method for producing an activated carbon which comprises burning waste tires containing metal cord at 400°–900° C. in the presence of oxygen and in the presence of $CO_2$ and water vapor.

PREFERRED EMBODIMENTS OF THE INVENTION

An aspect of the present invention is to provide a useful activated carbon having particular characteristics.

The activated carbon according to the present invention has pencil hardness of from B to 6B, preferably from 2B to 4B, pore size of 100–400 Å, preferably 200–350 Å, specific surface area of 150–500 m$^2$/g, preferably 200–400 m$^2$/g, pore volume of 1.3–5.0 ml/g, preferably 1.4–3.0 ml/g, and if desired, CEC of 8–13, preferably 9–12, and comprises carbon microcrystals irregularly arranged and difficultly graphitizable carbon which comprises difficultly graphitizable crosslinking lattices in the gaps among carbon microcrystals.

In the above, CEC (cation exchange capacity) is a capacity of substituting a base. Since fertilizer components are bases, the larger the CEC, the more the fertilizer components can be adsorbed thereto. That is, when the activated carbon of the present invention is mixed with soil, the activated carbon can function as soil. The CEC of the activated carbon is so large that it can adsorb a large amount of fertilizer components. The unit is milligram equivalent (ME). For example, 20 milligram equivalent of CEC means that 100 g of soil can grasp 20 milligram equivalent of base (fertilizer components). CEC of the activated carbon of the present invention is larger than that of commercially available activated carbon as shown in the following table.

Figure 8:
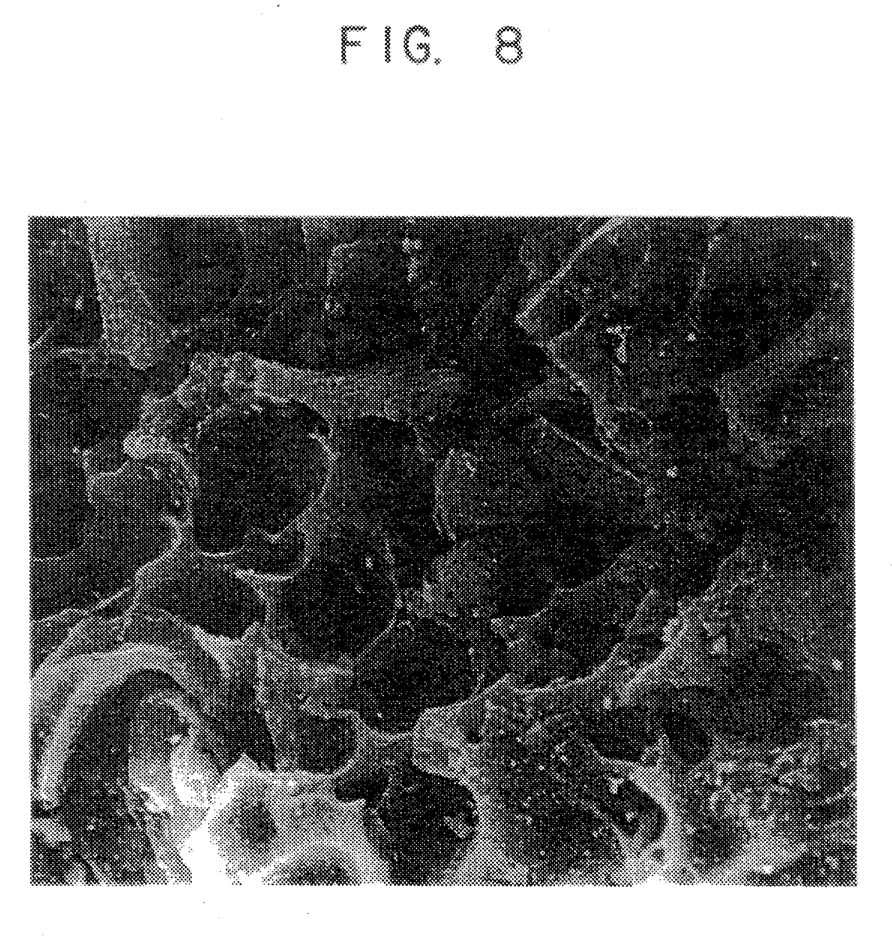
FIG. 8 is an electron microphotograph of the activated carbon of the present invention.

FIG. 8 shows an electron microphotograph of the activated carbon of the present invention. The magnification is 1000 times. This shows large pores, large pore volume and irregular arrangement.

The following table is given for comparing the activated carbon of the present invention with a commercially available activated carbon.

|  | Activated carbon of the present invention | Commercially available activated carbon |
| --- | --- | --- |
| Pencil hardness | B–6B | H |
| Pore size | 100–400 Å | 23.5–32.7 Å |
| Specific surface area | 150–500 m$^2$/g | 900–1010 m$^2$/g |
| Pore volume | 1.3–5.0 ml/g | 0.60–1.17 ml/g |
| CEC | 8–13 | 1–7 |

As is clear from the above table, the activated carbon of the present invention has a lower hardness, larger pore size and larger pore volume than a commercially available activated carbon, and can adsorb large particles and molecules in light of the electron microphotographic structure, seemingly the activated carbon of the present invention can not deodorize and decolor due to its small specific surface area. However, it can surprisingly exhibit excellent deodorizing and decoloring functions. This appears to be attributable to the large pore size and volume.

The activated carbon of the present invention and commercially available activated carbon are further compared as to adsorbability in the following.

| a. Activated carbon of the present invention | |
| --- | --- |
| Oil: | adsorbed |
| Fungi: | adsorbed |
| Ammonia odor: | adsorbed |
| Speed of deodorizing: | very fast |
| Decoloring (Methylene Blue): | very fast |
| b. Commercially available activated carbon | |
| Oil: | not adsorbed |
| Fungi: | not adsorbed |
| Ammonia odor: | adsorbed with difficulty |
| Speed of deodorizing: | slow; taking a long time |
| Decoloring (Methylene Blue): | ordinary |

The activated carbon of the present invention produced by burning waste tires contains, for example, the following components and shows the following pH.

| Component | % by weight |
| --- | --- |
| Moisture | 0.43–0.61 |
| Carbon (C) | 53.8–62.9 |
| Total nitrogen (T-N) | 0.244–0.293 |
| Phosphoric acid (P$_2$O$_5$) | 0.584–0.611 |
| Potassium (K$_2$O) | 0.525–0.574 |
| Calcium (CaO) | 4.62–4.69 |
| Magnesium (MgO) | 0.665–0.670 |
| Sulfur (S) | 0.31–0.37 |
| Vaporizable matters (mostly) | balance |
| Carbon ratio (C/N) | 220–226 |
| pH (H$_2$O) | 10.15–10.44 |

The activated carbon is soft (low pencil hardness), but the structure Strength is high since the carbon ratio (C/N) relating to the bonding force is as high as about 200.

Carbon ratio of commercially available activated carbon is about 70.

The activated carbon of the present invention can be used for adsorbing various substances. For example, it is used for adsorbing and treating agricultural chemicals, for example, an aqueous solution of Quinoline-copper [bis(quinolin-8-olate)copper]. When 310 mg/l of Quino-line-copper is contained and activated carbons having particle size of 1 mm or less and particle size of 2 mm or less were used, the contents of Quinoline-copper after the treatment were 0.072 mg/l and 0.13 mg/l, respectively.

The activated carbon of the present invention can be also used effectively for removing trihalomethane in water supply, purification of mineral ice, and for removing phenols as starting materials for synthetic resin materials.

Another aspect of the present invention relates to removal of SO$_2$ and/or Nox in the exhaust gas from heavy oil combustion, for example, from heavy oil combustion boilers by adsorbing SO$_2$ and/or Nox using the activated carbon of the present invention.

These harmful substances, SO$_2$ and Nox, can be removed by passing the exhaust gas through a layer containing the activated carbon of the present invention.

According to the present invention, for example, an apparatus of the following structure can be used for carrying out the method of removing SO$_2$ and/or Nox from said exhaust gas.

The apparatus comprises a conduit for discharging to the open air the exhaust gas formed by the combustion of heavy oil, for example, the exhaust gas from a heavy oil combustion boiler and a screen portion accommodating the activated carbon of the present invention. For example, the screen portion is composed of the activated carbon placed between parallel screens.

The screen surfaces are preferably substantially perpendicular to the axis of the conduit and the cross sectional area of the screen portion perpendicular to the axis of the conduit is preferably larger than the cross sectional area of the conduit so as not to disturb the flow of the exhaust gas as far as possible.

A device capable of exchanging the dirtied or saturated activated carbon as a result of adsorption of $SO_2$, Nox, soot and the like may be provided in the apparatus.

For example, one end of the screen portion is open to outside, said opening having a means for feeding the new activated carbon, for example, a belt conveyer, and the other end of the screen portion is open to outside and a means for discharging the used activated carbon, for example, a rotary blade is provided near the opening.

Further, the apparatus may be furnished with a means for controlling the feeding of the new activated carbon and the discharging of the used activated carbon by detecting the amount of the discharged used activated carbon.

In addition, there may be added to the apparatus a means for storing a desired amount of new activated carbon to be fed to the apparatus, for example, an amount necessary for one day operation.

The exhaust gas formed by the combustion of heavy oil contains much soot. The activated carbon of the present invention has a small specific surface area, but a large pore size and a large pore volume. Therefore, the activated carbon can adsorb $SO_2$ and/or Nox without adversely affected by soot. In addition, the activated carbon is so soft (low pencil hardness) that soot is adaptable to the activated carbon and can be adsorbed thereto.

Examples of the method and the apparatus for removing $SO_2$ and/or Nox of the present invention are explained referring to the drawings.

Figure 1:
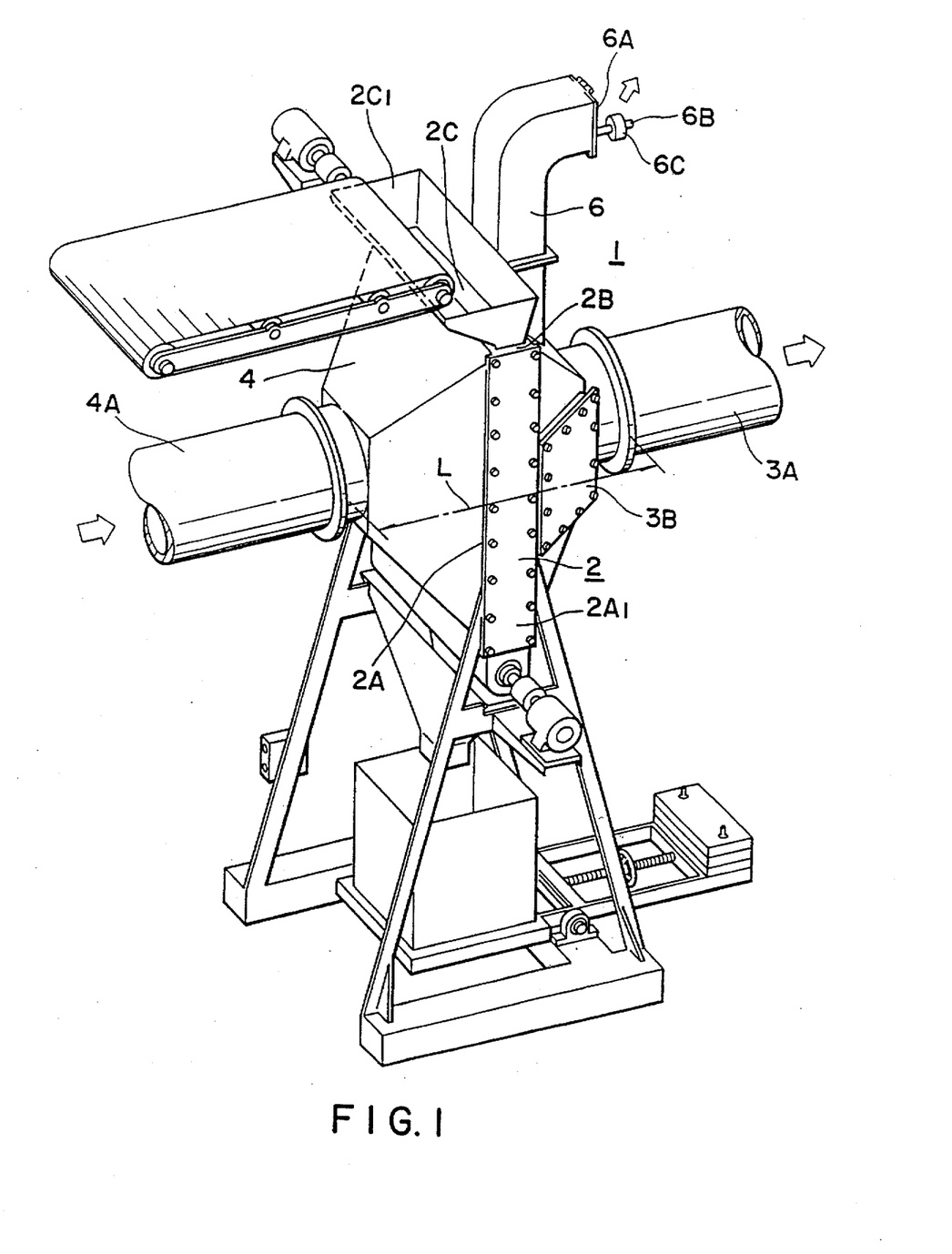
FIG. 1 is an oblique view of an embodiment of the apparatus for removing $SO_2$ and/or Nox by means of the activated carbon of the present invention.

In FIG. 1, 1 denotes an apparatus of the present invention for removing $SO_2$ and Nox by means of an activated carbon.

2 denotes a screen containing portion composed of left and right vertical walls 2A having a prescribed width, and upper and lower frames 2B provided between said walls and at the upper and the lower ends of said walls, and the said portion having the shape of a regular square.

2A1 denotes an openable screen exchanging hatch fitted to one or both of right and left vertical walls 2A at the screen containing portion.

And, upper opening 2C of the screen containing portion communicates with supplementing hopper 2C1 having an opening open upwards.

3 (FIG. 2) denotes a trumpet-shaped front exhaust gas introducing pipe provided at the front portion of the screen containing portion and communicating with smoke pipe 3 A quite near a chimney (not shown).

Figure 2:
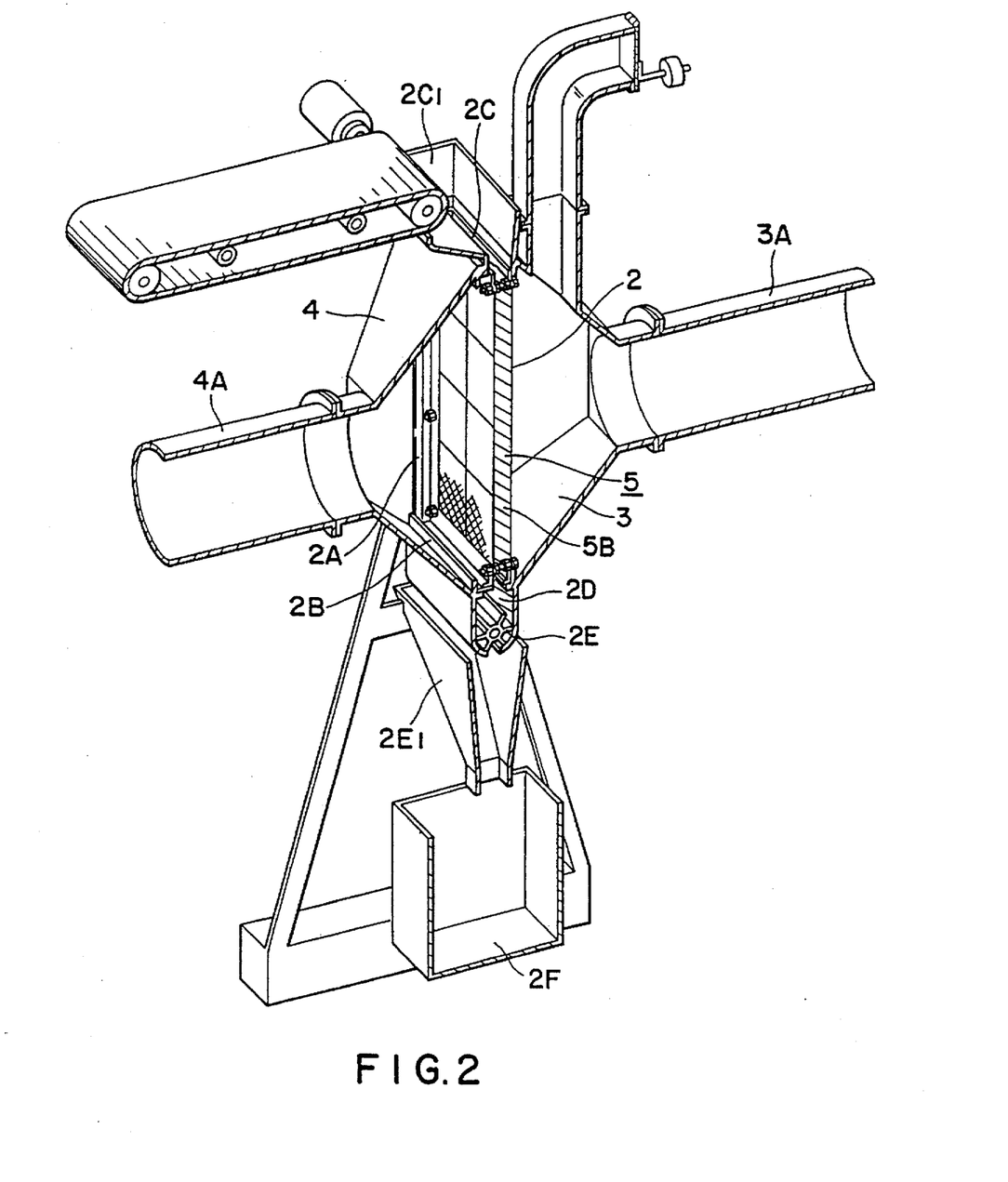
FIG. 2 is a cross sectional view of the apparatus in FIG. 1.

This trumpet-shaped front exhaust gas introducing pipe 3 has openable inspecting hatch 3B at the side wall of said pipe 3. This hatch serves to clean the screen net when it becomes dirty.

4 denotes a trumpet-shaped rear exhaust gas introducing pipe provided at the rear portion of the screen containing portion and communicating with smoke pipe 4A quite near a heavy oil combustion boiler (not shown).

6 is an increased pressure releasing exhaust gas pipe standing from and communicating with the upper surface of trumpet-shaped front exhaust gas introducing pipe 3 and serves to release the exhaust gas pressure when the adsorption by the activated carbon is saturated.

The upper end opening of the increased pressure releasing exhaust gas pipe is provided with openable lid 6A and said lid is furnished with lever 6B having weight 6C corresponding to the exhaust gas pressure.

L denotes the length between the end of trumpet-shaped front exhaust gas introducing pipe 3 and the end of trumpet-shaped rear exhaust gas introducing pipe 4.

In FIG. 2, lower discharging opening 2D is furnished with rotary blade 2E capable of stopping falling of and discharging of activated carbon 5B contained in the screen containing portion by means of screen frames.

2E1 is a chute communicating with the lower surface of rotary blade 2E and the lower end of 2E1 is furnished with a receiving box 2F for the used activated carbon.

Screen portion 5 removably fitted to screen containing portion 2 is composed of screen frame 5A (FIG. 3) and activated carbon 5B packed in said screen frame 5A.

2A, 2B, 2C, 2C1, 3, 3A, 4 and 4A denote the same members or portions, corresponding to the like reference numerals in FIG. 1.

Figure 3:
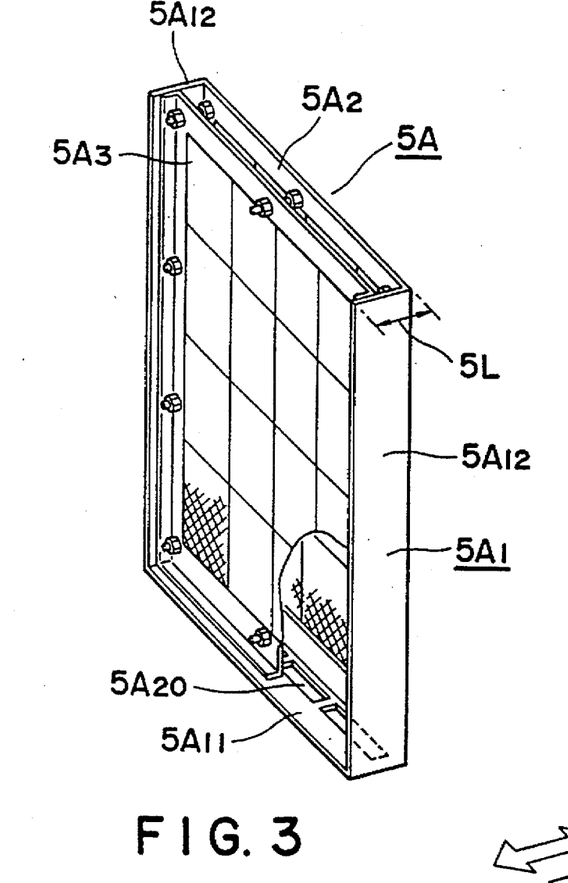
FIG. 3 is an oblique view of a screen frame used in the apparatus in FIG. 1.

In FIG. 3, screen frame 5A is composed of frame portion 5A1 and front and rear screens 5A2 and 5A3 provided at the front surface and the rear surface of the frame portion, respectively.

Frame portion 5A1 is composed of bottom plate 5A11 of a prescribed width and left and right vertical walls 5A12 standing from the left and the right ends of the bottom plate, respectively.

Further, the bottom plate 5A11 is furnished with several holes 5A20 for falling the used activated carbon.

Further, front screen 5A2 is fitted to the front edge of frame portion 5A1 and rear screen 5A3 is fitted forward and backward adjustably to front screen 5A2.

Figure 4:
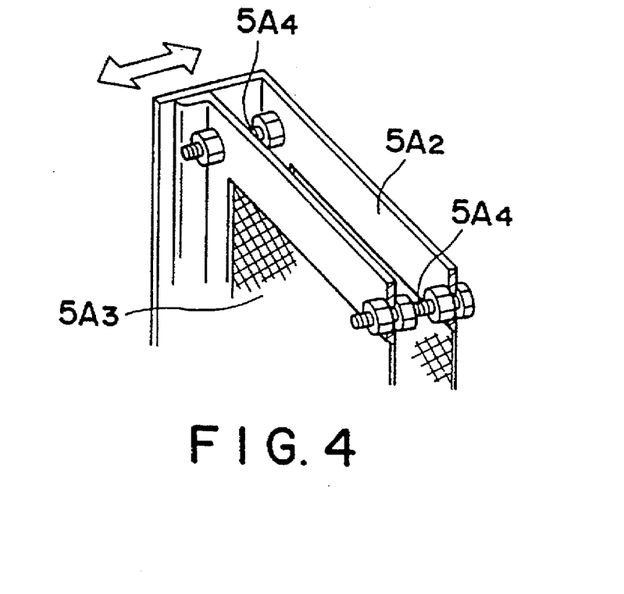
FIG. 4 is an enlarged oblique view of a part of the screen frame of FIG. 3.

5L denotes the thickness of the frame portion. FIG. 4 is a partly enlarged oblique view of screen portion in FIG. 3.

5A4 is a connecting bolt for supporting the rear screen forward and backward movably.

In such a way as above, the volume of screen frame 5A (FIG. 3) can be appropriately adjusted by moving screen 5A3 forward or backward.

Front and rear screens 5A2 and 5A3 are composed of a regular square frame to which a net of a prescribed mesh is fitted. The mesh is 2 mm mesh.

Figure 5:
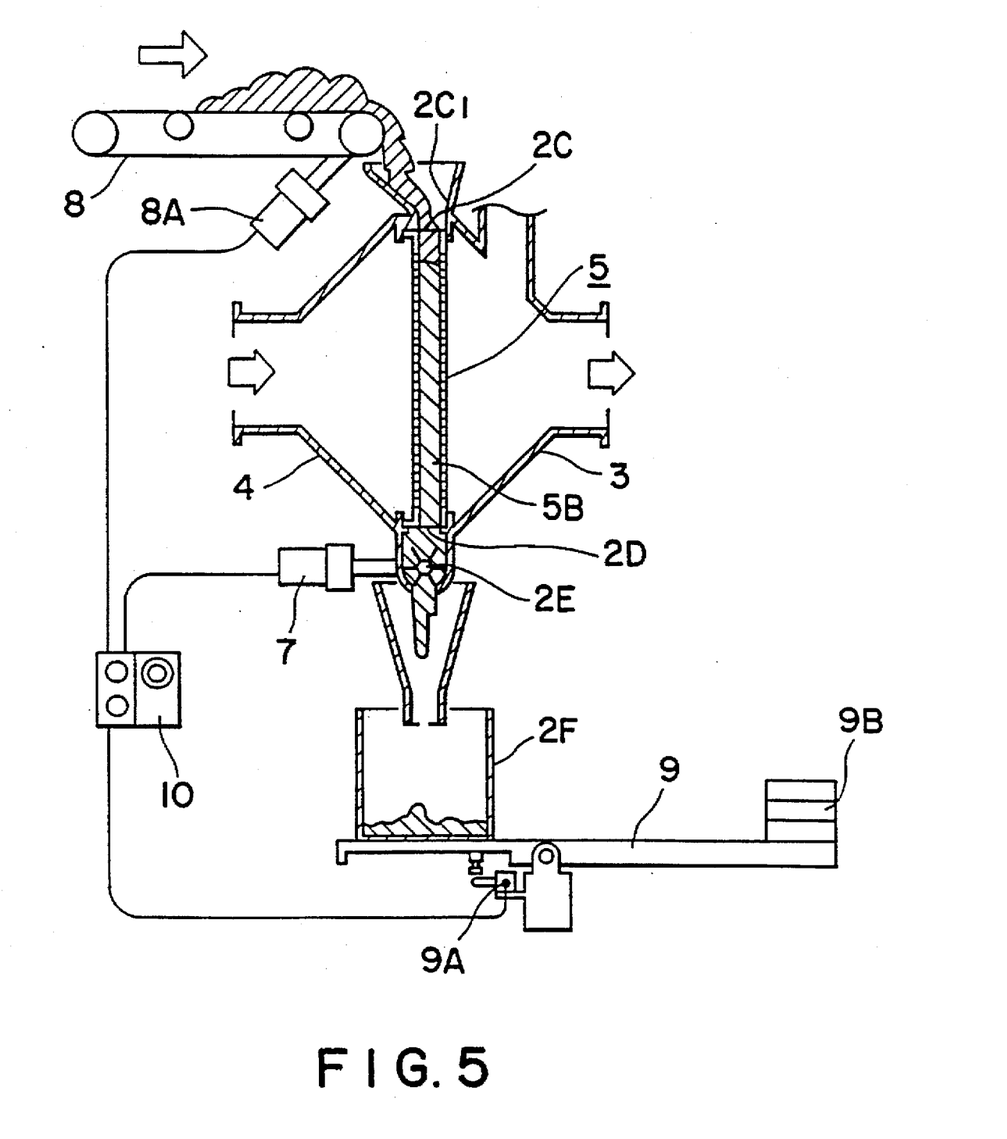
FIG. 5 and FIG. 6 are diagrammatical cross sectional views of the apparatus of FIG. 1 with a means for controlling feeding of the activated carbon.
Figure 6:
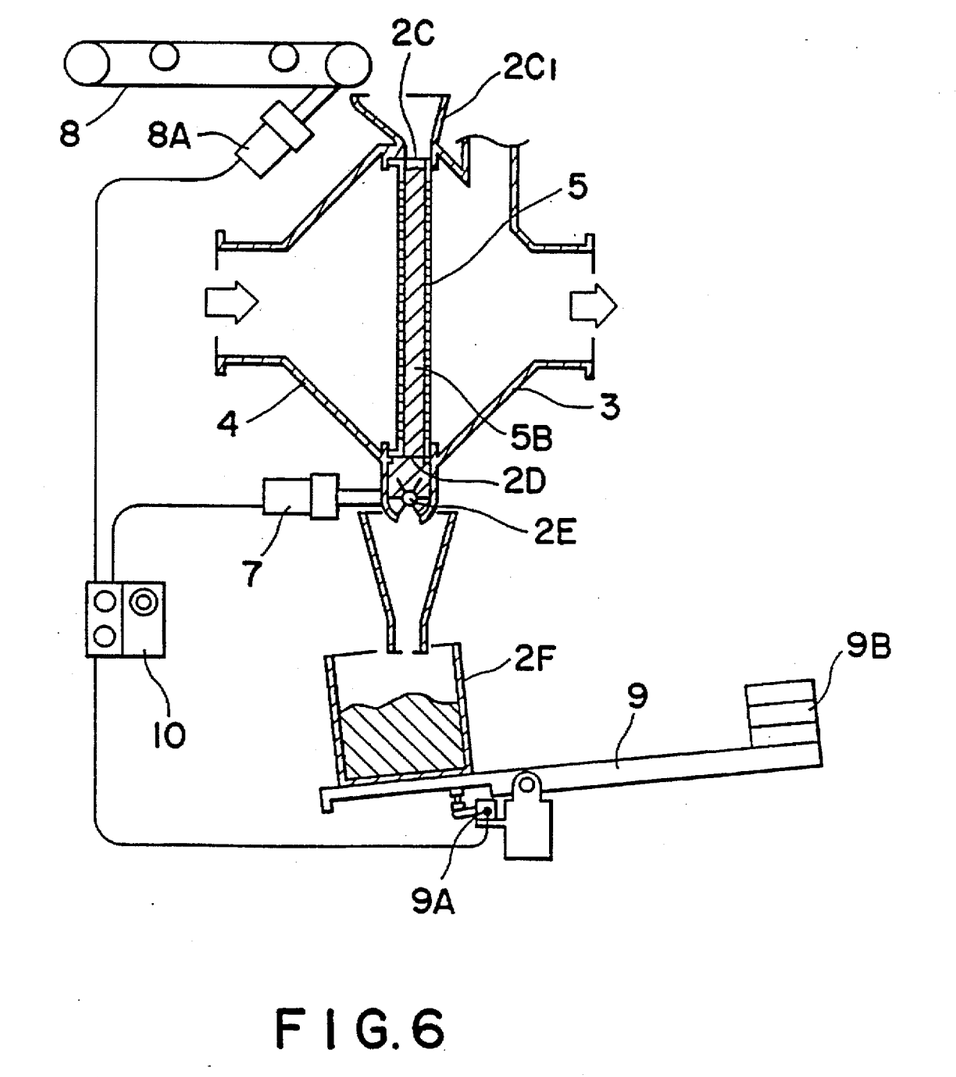

In the following there are explained mechanisms of discharging of the used activated carbon in screen portion 5 and feeding of new activated activated carbon referring to FIG. 5 and FIG. 6. Motor 7 is fitted to rotary blade 2E.

Conveyer 8 for feeding new activated carbon to supplementing hopper 2C1 is provided, and the conveyer is furnished with motor 8A.

Receiving box 2F for accepting the used activated carbon is placed on holder 9 capable of actuating sensor 9A by its weight.

9B is a counter weight. When timer switch 10 becomes "ON", motor 7 and motor 8A are driven to discharge the used activated carbon while feeding new activated carbon, and when the used activated carbon is accumulated in receiving box 2F, sensor 9A is actuated to stop motor 7 and motor 8A.

The purification action to the exhaust gas is naturally effected continuously.

When activated carbon 5B is dirtied with $SO_2$ and Nox, in view of the experimental data available heretofore, motor 7 is actuated by timer switch 10 to drive rotary blade 2E at intervals of 3–4 hours so as to let fall activated carbon 5B through discharge opening 2D simultaneously with supplementing new activated carbon through supplementing hopper 2C1 by way of upper opening of screen portion 2C.

While supplementing new activated carbon, the exhaust gas from the boiler is passed through the smoke pipe, trumpet-shaped front exhaust gas introducing pipe 3, screen portion 5, and trumpet-shaped rear exhaust gas introducing pipe 4 to adsorb $SO_2$ and Nox in the passing exhaust gas by using activated carbon 5B, and the resulting exhaust gas containing reduced amounts of $SO_2$, Nox and the like is released from a chimney to the open air.

Figure 7:
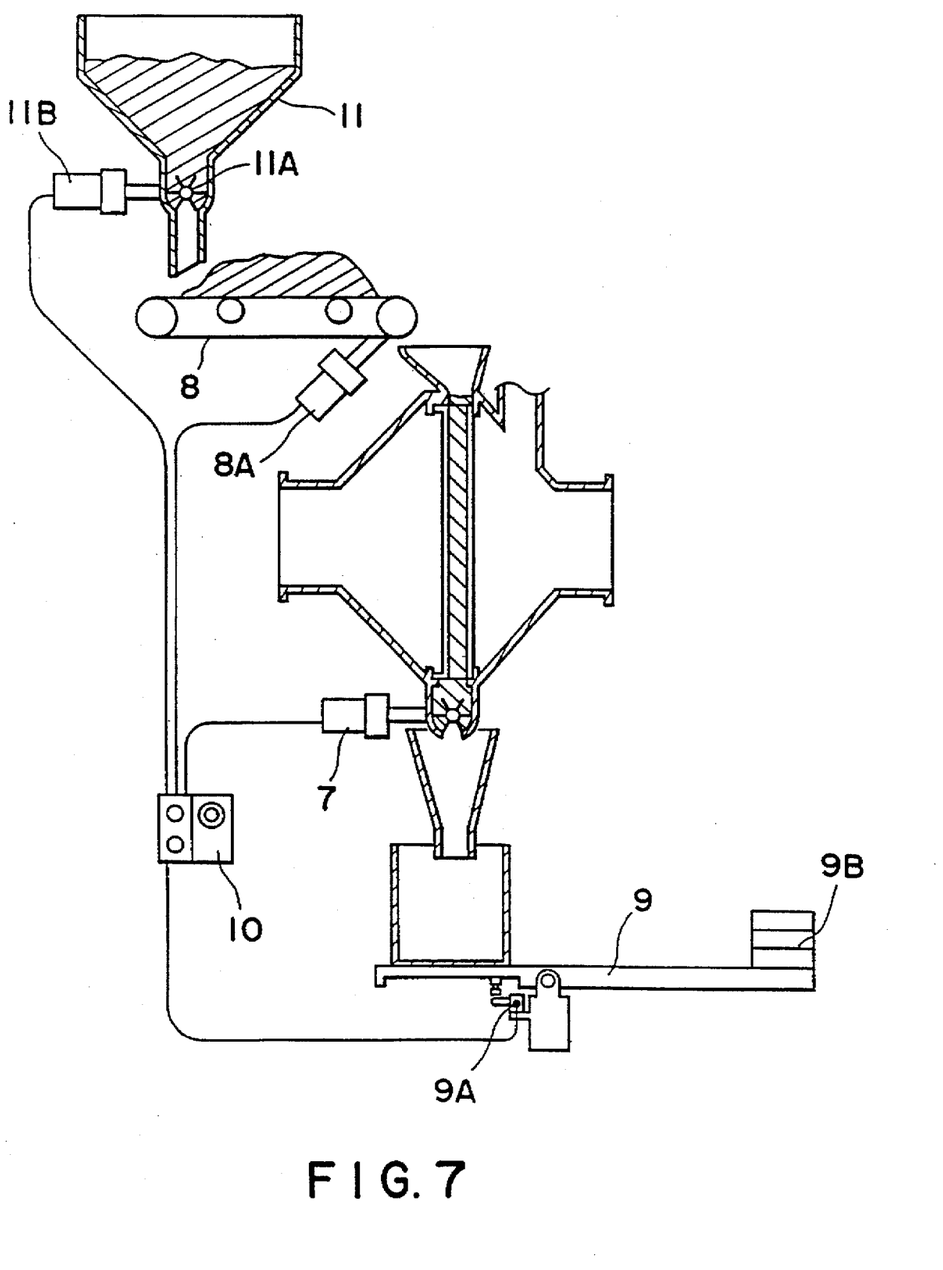
FIG. 7 is a diagrammatical cross sectional view of another embodiment of the apparatus of the present invention.

As shown in FIG. 7, the apparatus may be constructed such that hopper 11 having rotary blade 11A can supply the new activated carbon to conveyer 8, the capacity of hopper 11 being the weight of activated carbon for one day operation, for example, 100 kg, and motor 11B capable of driving rotary blade 11A is actuated by timer switch 10.

7, 8A, 9, 9A, and 9B denote the same members or portions as above.

The present inventors made experiments under the following conditions.

| | |
|---|---|
| a. Diameter of a smoke pipe: | 585 mm |
| b. The length, L, between the end of trumpet-shaped front exhaust gas introducing pipe 3 and the end of trumpet-shaped rear exhaust gas introducing pipe 4: | 1400 mm |
| c. The volume of screen portion 5: | |
| Thickness 5L | 90 mm |
| Height | 1530 mm |
| Width | 1020 mm |
| The thickness, 90 mm, can be varied by moving rear screen 5A3 to front or rear. Thus the volume of screen frame 5A can be appropriately adjusted. | |
| d. The packed amount of the activated carbon in the screen portion: | 28 kg |
| e. Particle size of the activated carbon: | 4 mm–6 mm |
| Sulfur content (kg/hr) calculated from the fuel for experiments: | 6.2 kg/hr × 6 hr = 37.2 kg (9672 mm$^2$*) |
| Adsorbed amount calculated from data concerning 28 kg of the activated carbon: | 14.95 kg (3887 mm$^2$*) |

*. Area of screen

| Lapse of time (hr) | Concentration of $SO_2$ (ppm) | $SO_2$ removed by adsorption (%) |
|---|---|---|
| 0 | 403 | |
| 1 | 80 | 80 |
| 2 | 180 | 55 |
| 3 | 280 | 31 |
| 4 | 300 | 26 |

| Lapse of time (min) | Concentration of Nox (ppm) | Nox removed by adsorption (%) |
|---|---|---|
| 0 | 260 | |
| 10 | 60 | 77 |
| 20 | 140 | 46 |
| 30 | 260 | 0 |

Since molecular weight of Nox is large, the pore volume is filled soon. Therefore, the adsorption speed is high, but the adsorption ceases in a short time. When the packing amount of activated carbon is increased, the amount of molecules adsorbed can be increased so that the time is lengthened.

In order to keep the concentration of 180 ppm in the thus treated exhaust gas, the timer is set to 2 hours.

By increasing the thickness of screen portion 5 of activated carbon to 100 mm, the adsorption time can be lengthened and therefore the period of time between the activated carbon exchanging operations can be simply lengthened.

| | |
|---|---|
| Air ratio: | 1.65 |
| Exhaust gas temperature: | 240° C. |
| Flow rate (max.): | 8.75 m/s |
| Flow rate (min.): | 8.44 m/s |
| Exhaust gas Static pressure: (mm Hg) | (max) 3.0–1.9 |
| Flow rate: (m$^3$/hr) | (max) 4400–3800 | f. According to the present invention, referring to FIG. 7, it is possible to constitute such that 100 kg/one day of the activated carbon is placed in a hopper and transferred to a belt conveyer to feed to the filter.

The activated carbon of the present invention can be produced by burning waste tires. For example, an activated carbon produced by burning waste tires in a boiler as disclosed in Japanese Patent Application Laid-open No. Hei 1-127812 may be used.

The activated carbon of the present invention can be produced by burning waste tires containing metal cord such as steel cord, silicon steel cord and the like at 400°–900° C., preferably 700°–800° C. in the presence of oxygen and in the presence of $CO_2$ and water vapor.

Air used for the combustion of the waste tires is preferably of high humidity, for example, relative humidity of at least 60%, if desired, water is added to the combustion atmosphere in an appropriate way.

After formation of the activated carbon, metal cord fragments are removed, for example, by using a magnet. Then the resulting activated carbon particles are subjected to screening to obtain the particles in desired particle size range. Therefore, pelletization is not necessary. Naturally, if necessary, particles of a size less than the desired particle size may be pelletized to produce desired particles.

This production procedure is quite different from a method comprising strongly heating a carbon-containing material in the absence of air (oxygen) to effect dry distillation followed by adding active hydrogen, or a method comprising fully carbonizing a carbonaceous material and then activating the resulting carbon by steam or a treatment with chemicals.

As is clear from above, the activated carbon of the present invention can be produced without a multiple-step method including an activation step or complicated procedures as in conventional methods. The mechanism of producing the activated carbon of the present invention having the excellent properties in a single step is not clearly understood. Although it is not desired to limit the invention to any particular theory, it is believed that the metal cord (a twisted thin metal wire) is broken into fragments during the combustion and scattered in the waste tire materials to act in a catalyst-like manner or act physically on the materials, and further $CO_2$ and water present in the combustion atmosphere simultaneously activate the carbonaceous material.

The amount of the metal cord is preferably at least 1/3 times the weight of the waste tire. When said amount is less than 1/3 times, the resulting adsorption ability is poor. More preferably, the amount is from about 4/10 times to about 9/10 times the weight of the waste tire.

In view of the foregoing, the present invention gives at least partly the following advantages.

(1). The activated carbon has a large pore volume and, due to the large pore volume, molecules of sulfur components and nitrogen components are adsorbed at a high speed. Since the pore volume is large, adsorption can be effected within a short time in correspondence with the molecular structures of $SO_2$ and Nox.

(2) 80% of harmful components in acidic rain is sulfur oxide ($SO_2$) and 20% thereof is nitrogen oxide (Nox), and the apparatus of the present invention can adsorb them.

(3) The apparatus of the present invention is simple. A cartridge system can be used in which the volume of the activated carbon is variable (e.g. by changing the space between the screens) depending upon the volume of the exhaust gas.

(4) Adsorption of $SO_2$ takes time so that the used activated carbon is exchanged by feeding a new activated carbon through a supplementing hopper by driving a rotary blade using a timer relay matching thereto.

(5) When waste tires are burned to prepare the activated carbon, activated carbon particles of convenient size have been already formed so that a drying step and a water-soaking procedure to remove air are not necessary.

(6) When the capacity of the activated carbon used has reached the quantitative limit judging from the flow speed and flow rate of a harmful exhaust gas and the pressure drop has reached the limit judging from the exhaust gas resistance, discharging and feeding of activated carbon are repeated by means of a timer relay while releasing the pressure.

(7) The largest advantage is that the adsorption speed of Nox by the activated carbon of the present invention is much faster than that by a commercially available activated carbon, and the adsorption capacity (weight of adsorbate per unit weight of adsorbent) of $SO_2$ by the activated carbon is about 1.7 times that by commercially available activated carbons. Further, resistance to gas flow is small and the apparatus can be compact.

(8) Since the CEC is larger than that of commercially available activated carbon, the activated carbon after having adsorbed $SO_2$ and Nox (i.e. after used) can be used by mixing with peat, or with cattle, fowl or pig droppings to deodorize and then used as a compost.

(9) 50% or more of Nox in the exhaust gas from a heavy oil combustion boiler can be removed. The cost of the activated carbon of the present invention is half of that of commercially available activated carbon.

(10) The apparatus of the present invention is of a dry type different from wet type removing apparatuses, and the production of the activated carbon is simpler than that of the wet type adsorbent and the activated carbon can be simply inserted to and discharged from the filter resulting in a low initial cost. The cost is one tenth as much.

(11) The activated carbon of the present invention can be used as a soil improving agent by burying said carbon in or mixing said carbon with soil. For example, acidic soil water can be neutralized so that lime or fused phosphate fertilizer is not necessary. The high CEC results in good holding of fertilizer. The activated carbon which has adsorbed sulfur component and nitrogen component also can be used as a soil improving agent and the sulfur and nitrogen components act as fertilizers.

Further, atmospheric pollution caused by low quality oils can be overcome by using the filter of the present invention. In particular, the present invention is suitable for heavy oils of high sulfur content.

What is claimed is:

1. A method for producing an activated carbon which comprises burning waste tires containing metal cord at 700°–800° C. in the presence of oxygen and in the presence of $CO_2$ and water vapor, and recovering said activated carbon.

2. The method according to claim 1 in which the metal cord is steel cord.

3. The method according to claim 1 in which the metal cord is silicon steel cord.

4. A method for producing an activated carbon which comprises burning waste tires containing metal cord at 700°–800° C. in the presence of oxygen and in the presence of $CO_2$ and water vapor, and recovering said activated carbon, wherein said metal cord is contained in an amount of 1/3 times the weight of the waste tire or more.

5. The method according to claim 4 in which the metal cord is contained in an amount of from 4/10 times to 9/10 times the weight of the waste tire.

6. A method for producing an activated carbon which comprises burning waste tires containing metal cord at 700°–800° C. in the presence of oxygen and in the presence of $CO_2$ and water vapor and at a relative humidity of at least 60%, and recovering said activated carbon.

7. A method for producing an activated carbon which comprises burning waste tires containing metal cord at 700°–800° C. in the presence of $CO_2$ and water vapor and at a relative humidity of at least 60%, and recovering said activated carbon, wherein said metal cord is a steel cord and said steel cord is present in said waste tire in an amount of from 4/10 times to 9/10 times the weight of said waste tire.

* * * * *